(12) United States Patent
Piper

(10) Patent No.: US 9,378,368 B2
(45) Date of Patent: Jun. 28, 2016

(54) SYSTEM FOR AUTOMATICALLY COLLECTING AND ANALYZING CRASH DUMPS

(71) Applicant: Parsons Corporation, Pasadena, CA (US)

(72) Inventor: Scott Piper, Silver Spring, MD (US)

(73) Assignee: Parsons Corporation, Pasadena, CA (US)

( * ) Notice: Subject to any disclaimer, the term of this patent is extended or adjusted under 35 U.S.C. 154(b) by 70 days.

(21) Appl. No.: 14/265,885

(22) Filed: Apr. 30, 2014

(65) Prior Publication Data

US 2015/0317477 A1 Nov. 5, 2015

(51) Int. Cl.
*G06F 21/55* (2013.01)
*G06F 11/07* (2006.01)

(52) U.S. Cl.
CPC ............ *G06F 21/554* (2013.01); *G06F 11/079* (2013.01); *G06F 11/0778* (2013.01)

(58) Field of Classification Search
None
See application file for complete search history.

(56) References Cited

U.S. PATENT DOCUMENTS

| | | | | |
|---|---|---|---|---|
| 6,769,077 B2* | 7/2004 | Vachon | ............... | G06F 11/3636 714/43 |
| 7,702,959 B2* | 4/2010 | Hwang | ................ | H04L 41/069 714/37 |
| 7,895,448 B1* | 2/2011 | Satish | ................... | G06F 21/577 713/187 |
| 8,250,654 B1* | 8/2012 | Kennedy | ................. | H04L 41/22 713/187 |
| 9,158,661 B2* | 10/2015 | Blaine | ................. | G06F 11/3648 |
| 2003/0221123 A1* | 11/2003 | Beavers | ................... | G06F 21/55 726/23 |
| 2004/0205327 A1* | 10/2004 | Morrison | ............. | G06F 11/0748 713/1 |
| 2006/0143430 A1* | 6/2006 | Morrison | ............. | G06F 11/0748 713/1 |
| 2007/0162975 A1* | 7/2007 | Overton | .............. | H04L 63/1416 726/24 |
| 2010/0325490 A1* | 12/2010 | Anvin | .................. | G06F 11/0748 714/37 |
| 2015/0288706 A1* | 10/2015 | Marshall | ............... | H04L 63/145 726/23 |

OTHER PUBLICATIONS

Corporate Error Reporting Architecture. Microsoft Software Assurance for Volumn Licensing. Microsoft, 2003.* youtube video: Davidov, Mikhail and Carstens, Tim, "The schadenfreude of unreliable exploits: Going beyond Dr. Watson", https://www.youtube.com/watch?v=CjC7fNsGpcl (transcript attached), uploaded Oct. 13, 2011.

* cited by examiner

*Primary Examiner* — Michael R Vaughan
(74) *Attorney, Agent, or Firm* — Jeffrey G. Sheldon; Leech Tishman Fuscaldo & Lampl

(57) ABSTRACT

A system for automatically collecting and analyzing crash dumps to determine if a security exploit was unsuccessful and generating a report.

8 Claims, 14 Drawing Sheets

Cran
Crash Analyzer

Crashes received

Filter data

Show [10▼] entries

Search: [_____]     [Show / hide columns]

| Submission date ▽ | Executable ⇕ | Version ⇕ | Source ⇕ | Machine ⇕ | User ⇕ | Maliciousness ⇕ | Event Type ⇕ |
|---|---|---|---|---|---|---|---|
| No data vailable in table | | | | | | | |

Showing 0 to 0 of 0 entries                                    ◁ Previous  Next ▷

Details
No crashes selected

*fig. 2*

Cran
Crash Analyzer

Admin - Settings

Server settings

| | |
|---|---|
| Hostname* | 192.168.11.176 |
| Use SSL for crash collection* | ☐ |
| Default storage* | C:\Program Files (x86)\Cran\cran\uploads |

Alert settings

| | |
|---|---|
| Email alerts* | ☐ |
| Recipients* | recipients |
| Username* | user |
| Password* | ........ |
| SMTP host* | smtp.gmail.com |
| SMTP port* | 587 |
| Use TLS* | ☑ |

[Send test email]

[Ignore changes] [Save changes]

Cran
Crash Analyzer

Admin - Settings

Server settings

Hostname*  [192.168.11.176]

Use SSL for crash collection*  ☐

Default storage*  [C:\Program Files (x86)\Cran\cran\uploads]

Alert settings

Email alerts*  ☐

Recipients*  [recipients]

Username*  [user]

Password*  [........]

SMTP host*  [smtp.gmail.com]

SMTP port*  [587]

Use TLS*  ☑

[Send test email]

[Ignore changes]  [Save changes]

SYSTEM FOR AUTOMATICALLY COLLECTING AND ANALYZING CRASH DUMPS

FIELD OF THE INVENTION

The present invention relates generally to computer system security, and more specifically to a system for automatically collecting and analyzing crash dumps to determine if a crash is the result of an unsuccessful security exploit and generating reports and alerts.

BACKGROUND

Exploits often crash applications because they were made for different versions of the software or operating system than the client is running. It's only a matter of time before the attacker reacts to these failures and penetrates the network.

Current exploit detection products all work by stopping or identifying a successful exploit on a client or server. Microsoft provides a product called System Center Operations Manager (SCOM) that is capable of collecting crash dumps from systems. However, it does not provide insight as to if these are due to exploitation attempts. Microsoft also provides a tool called "!exploitable" (pronounced "bang exploitable") that can determine if a crash was due to an exploitation attempt. Disadvantageously, a user has to manually collect crash dumps and feed the collected crash dumps to the program one at a time.

Memory dumps can provide important details for an incident responder or forensic analyst's investigations. Some applications can also provide a copy of the document that caused that crash, such as the malicious PDF involved.

Therefore, there is a need for a system for automatically collecting and analyzing crash dumps to determine if a crash is the result of an unsuccessful security exploit and generating reports and alerts.

SUMMARY

The present invention overcomes the limitations of the prior art by providing a system for automatically collecting and analyzing crash dumps. The system has a crash analysis server, a database and a user interface for operating and storing crash information. The crash analysis server can also have a crash collector module and a crash processor module that are operably with each other.

The crash collector module can comprise a web, a messaging queue module and a client reporting module that are used to inform a user of a system crash. The crash processor module also has an exploit analysis module and an exploit scoring module. One or more than one client system can communicate with the crash analysis server to monitor events and send crash reports.

The crash processor module is configured to analyze crash reports to determine a crash dump will be collected from the client system. If a crash dump is collected, then the crash processor module performs further analysis on the crash dump to assign a maliciousness score in a range of 0 to 100.

The web server module implements an error reporting protocol as currently defined in the corporate error reporting v.1 and v.2 protocol specifications. Additionally, a user interface is displayed using the web server module.

The crash reporter module transmits data, such as an information record, to a database for storage. The record can comprise: a user, a machine name or identifier, an IP address and a MAC address of the one or more than one client system. These information records can be displayed on the user interface. The crash reporter also queues a work order to a messaging server module to transmit an alert when a maliciousness score above a threshold is detected by the crash processor.

The messaging server module can also display an alert on the user interface when a maliciousness score above a threshold is detected by the crash processor.

There is also provided a method for using the system for automatically collecting and analyzing crash dumps comprising the steps of: a) installing the crash analysis server; b) accessing the crash analysis server setting; c) configuring the crash analysis server; d) configuring a client system to report to the crash analysis server; e) receiving a crash dump from the client system; f) storing the crash dump in a storage; g) analyzing the crash dump; h) scoring the crash dump; i) Determining if the crash dump score qualifies as an attack; j) transmitting an alert if the crash dump score qualifies as an attack; and k) displaying an alert on a user interface if the crash dump score qualifies as an attack.

BRIEF DESCRIPTION OF THE DRAWINGS

These and other features, aspects and advantages of the present invention will become better understood with regard to the following description, appended claims, and accompanying figures where:

FIG. 2 is a screenshot of a user interface useful for the system of FIG. 1;

FIG. 3 is a screenshot of a settings page of the user interface;

Figure 8:
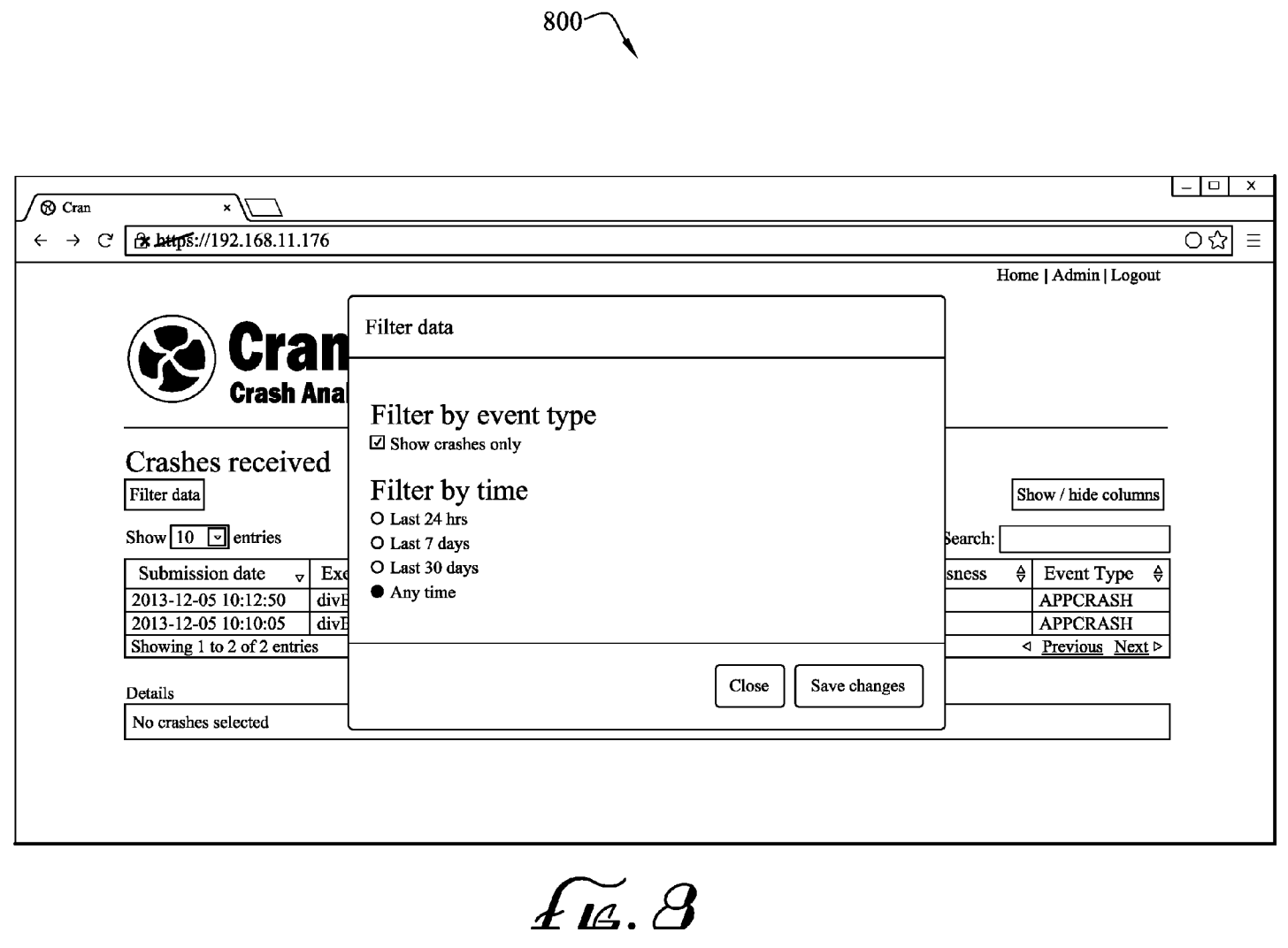

FIG. 8 is a screenshot of event filter options selectable in the user interface;

Figure 9:
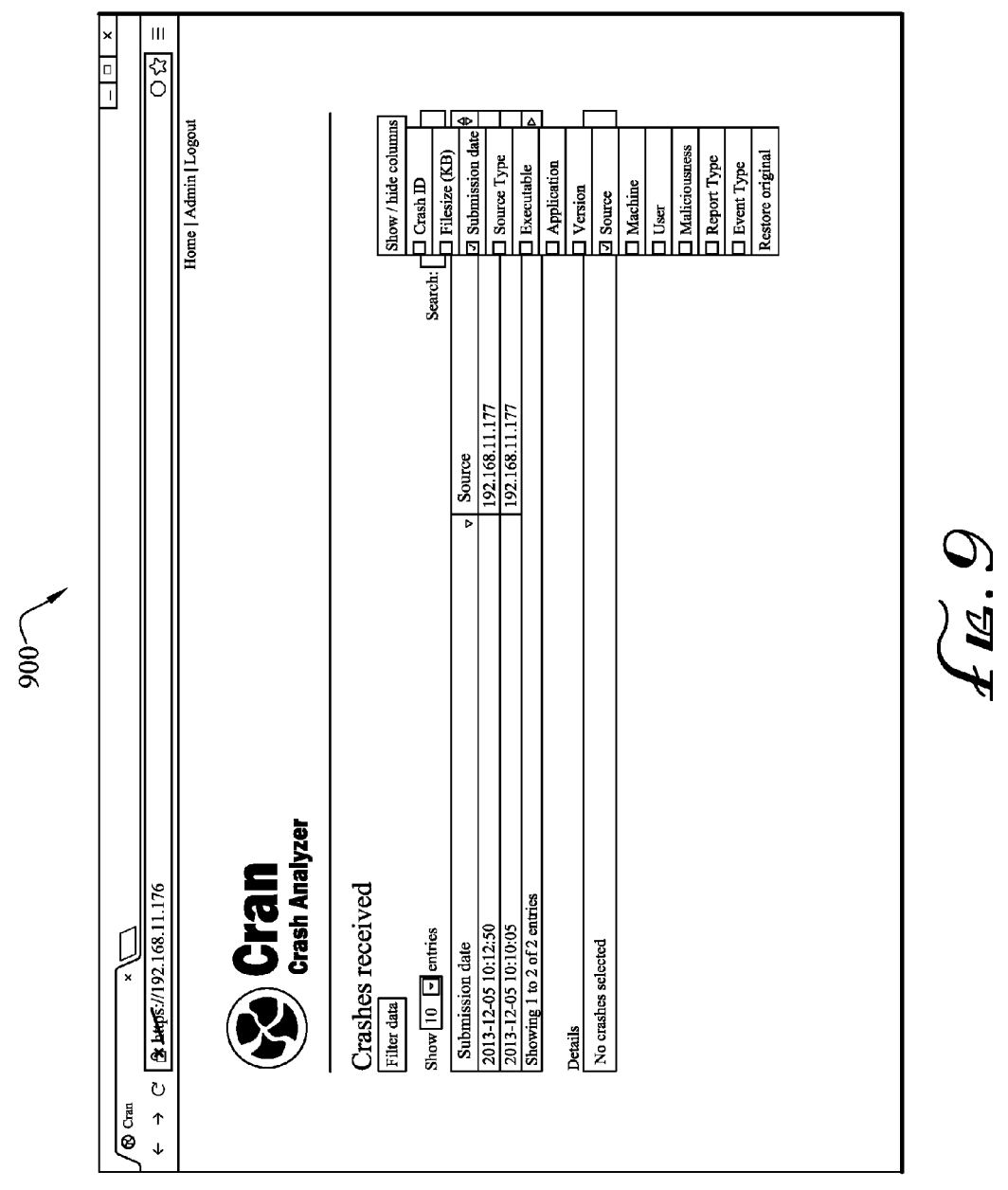

FIG. 9 is a screenshot demonstrating showing and hiding different columns of the user interface;

FIG. 10 is a screenshot of a settings page of the user interface;

Figure 13:
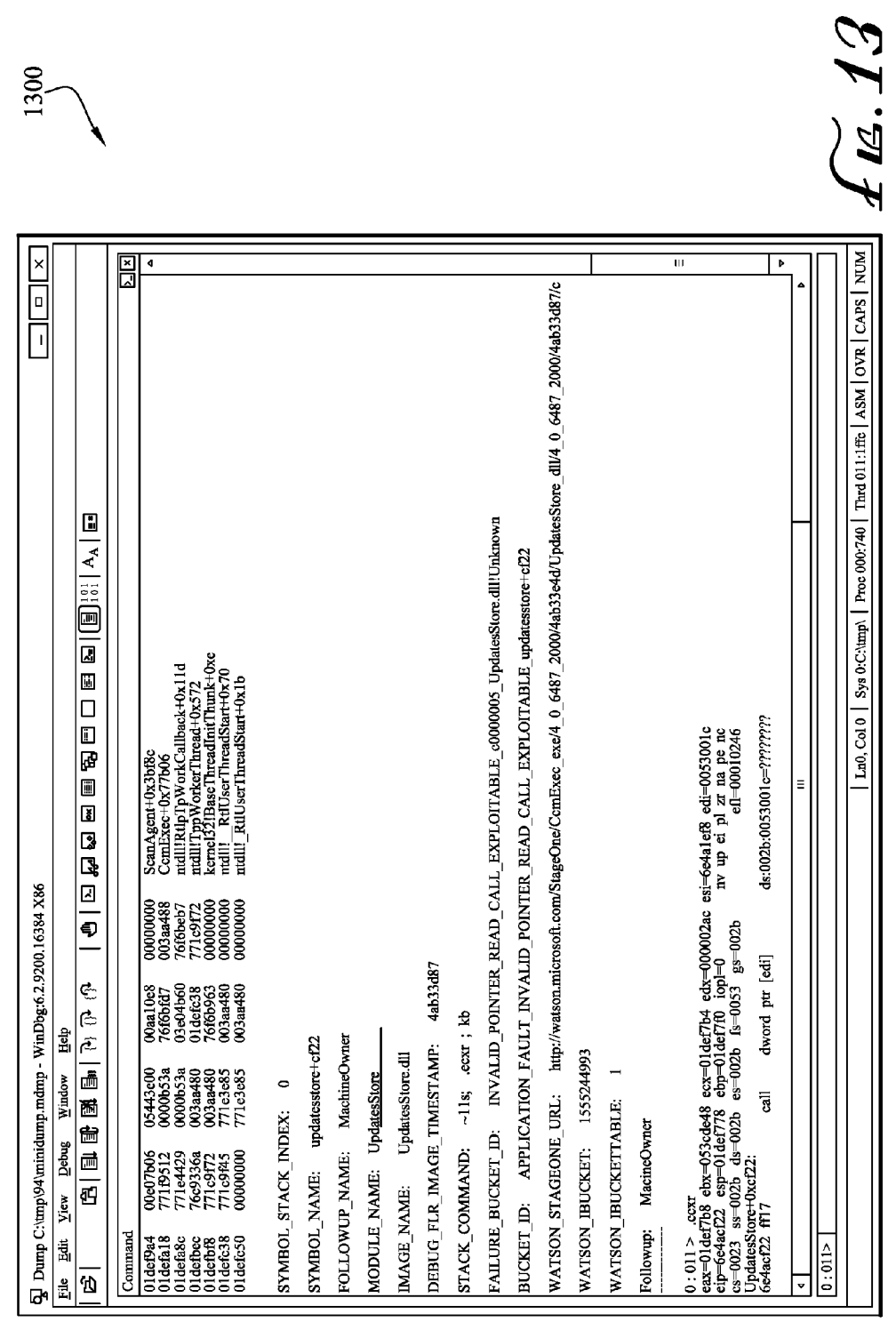

FIG. 13 is a screenshot of WinDbg useful to manually analyze crash data stored in a database of the system of FIG. 1.

DETAILED DESCRIPTION

Figure 1:
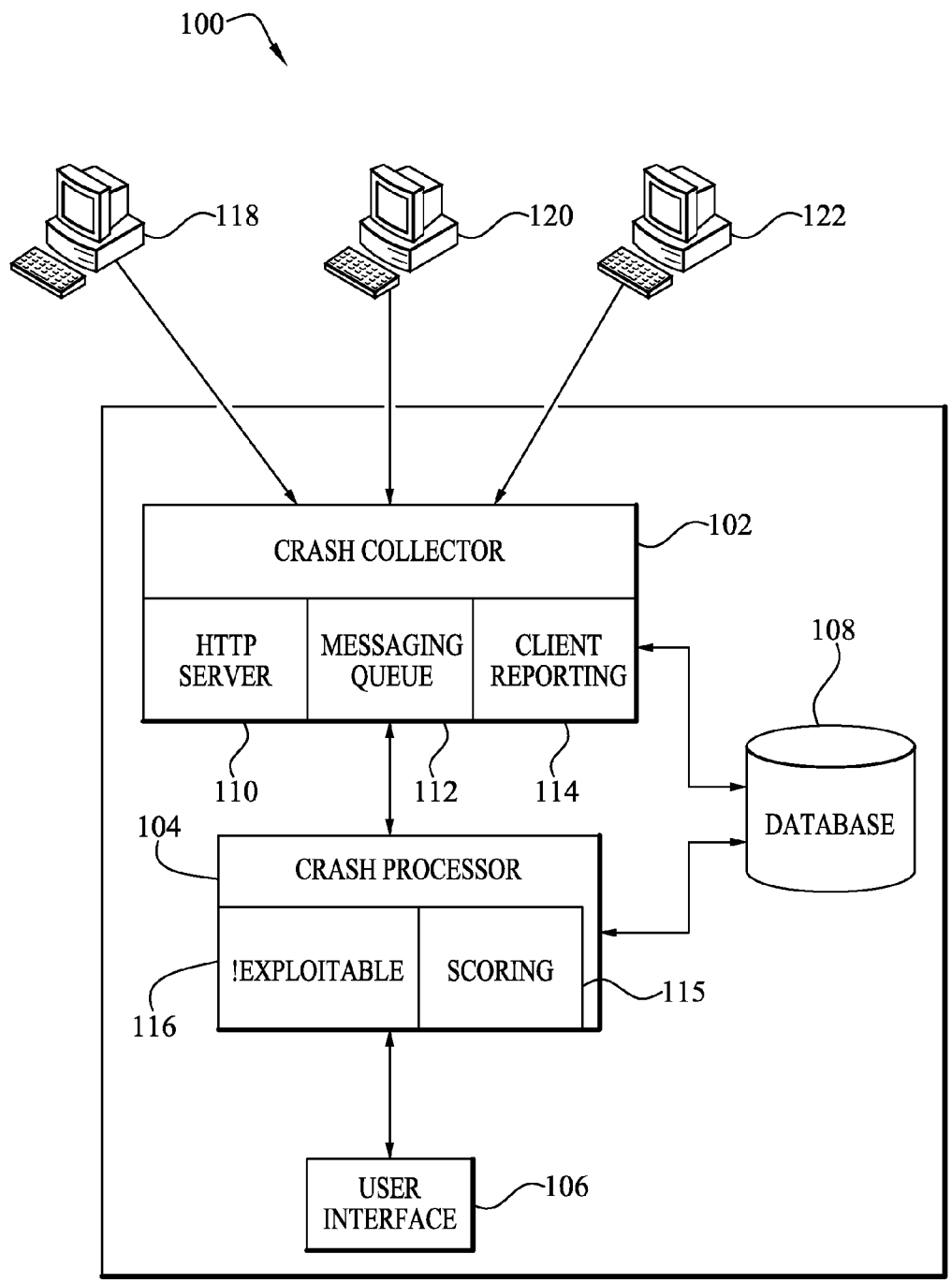
FIG. 1 is a flowchart of a system for automatically collecting and analyzing crash dumps to determine if a crash is the result of an unsuccessful security exploit and generating reports and alerts according to one embodiment.

The present invention overcomes the limitations of the prior art by providing a system for automatically collecting and analyzing crash dumps to determine if a crash is the result of an unsuccessful security exploit and generating reports and alerts. The system, hereinafter "crash analyzer" is a server that collects and analyzes crash dumps automatically and can provide alerts and reports. Client systems can be configured simply via a registry key setting, that causes any client system crashes to be reported to the crash analyzer as opposed to be sent to Microsoft through their Windows Error Reporting technology. The crash dumps can then be run through an analysis engine to determine if the crash was due to an exploitable event. The analyzed information can then be presented in a webpage and email alerts can be generated.

Additionally, the crash analyzer allows for not only attack intelligence, but also general system monitoring informing you how often your users are being affected by crashing applications that are not attack attempts. The crash analyzer server receives anything your system would normally send to the Microsoft Windows Error Reporting (WER) server. The crash analyzer detects these failed attempts. This gives your security team advance warning and an opportunity to react.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments may be practiced without these specific detail. Well-known circuits, structures and techniques may not be shown in detail in order not to obscure the embodiments. For example, circuits may be shown in block diagrams in order not to obscure the embodiments in unnecessary detail.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage may represent one or more devices for storing data, including read-only memory (ROM), random access memory (RAM), magnetic disk storage mediums, optical storage mediums, flash memory devices and/or other non-transitory machine readable mediums for storing information. The term "machine readable medium" includes, but is not limited to, portable or fixed storage devices, optical storage devices, wireless channels and various other non-transitory mediums capable of storing, comprising, containing, executing or carrying non-transitory instruction(s) and/or data.

Furthermore, embodiments may be implemented by hardware, software, firmware, middleware, microcode, or a combination thereof. When implemented in software, firmware, middleware or microcode, the program code or code segments to perform the necessary tasks may be stored in a machine-readable medium such as a storage medium or other storage(s). One or more than one processor may perform the necessary tasks in series, distributed, concurrently or in parallel. A code segment may represent a procedure, a function, a subprogram, a program, a routine, a subroutine, a module, a software package, a class, or a combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted through a suitable means including memory sharing, message passing, token passing, network transmission, etc.

Various embodiments provide a system for automatically collecting and analyzing crash dumps to determine if a crash is the result of an unsuccessful security exploit and generating reports and alerts. One embodiment of the present invention provides a system comprising one or more than one module for implementing a system for automatically collecting and analyzing crash dumps to determine if a crash is the result of an unsuccessful security exploit and generating reports and alerts. In another embodiment, there is provided a method for using the system. The system and method will now be disclosed in detail.

Referring now to FIG. 1, there is shown a diagram of a system 100 for automatically collecting and analyzing crash dumps to determine if a crash is the result of an unsuccessful security exploit and generating reports and alerts according to one embodiment. As can be seen the system comprises a crash collector module 102, a crash processor module 104 and a user interface 106. Collectively these modules 102, 104 and 106 comprise a crash analysis server 101.

The crash analysis server 101 listens for connections on ports 80 (HTTP) and 443 (HTTPS). Firewalls must be configured to allow traffic through to the crash analysis server 101. Ideally, a DNS name can be given to the crash analysis server 101 for ease of operation. The crash analysis server 101 can be completely self-contained and can be installed on a closed network that has no Internet access.

To avoid bandwidth issues, it is recommended that crash analysis server 101 be deployed near client systems 118, 120 and 120. The client systems 118, 120 and 122 will connect to the crash analysis server 101 as often as they would the Microsoft Windows Error Reporting (WER) servers, but the crash analysis server 101 can be configured to collect more data than the WER servers normally would. This includes collecting copies of the offending documents that are believed to have caused the crashes, and collecting memory dumps that are larger than what Microsoft collects.

The crash analysis server 101 can monitor event types assigned by the Microsoft reporting client. Some of the events received by crash analysis server 101 are not crashes, but are part of the CEIP (Customer Experience Improvement Program) or other program reports that send event reporting information to Microsoft®.

As can be appreciated, other client systems 118, 120 and 122 events can be programmed by adhering to the Microsoft specification.

The crash analysis server 101 uses crash report information to determine if it should collect a crash dump from the client systems 118, 120 and 120. If a crash dump was collected then further analysis is performed on the crash dump by the crash processor module 104 that may increase the suspected "maliciousness" score. This score defaults to 0, meaning it is not believed to be malicious. Higher scores, such as 90, indicate the analysis believes it could indicate something malicious was attempted, and should be reviewed further.

The crash collector module 102 comprises an HTTP server that implements a protocol defined in the "Corporate Error Reporting V.2 Protocol Specification," by the Microsoft® Corporation that is hereby incorporated by reference in its entirety. The crash collector module 102 comprises a client reporting module 114 that collects crash dumps from client systems 118, 120 and 122 when Windows Error Reporting starts after a crash occurs on the client systems 118, 120 and 120. The crash reporter module 102 transmits data to a database 108, and then queues a work order to a messaging server module 112.

Optionally, the crash collector module 102 can comprise a second service that can use Microsoft's® "Corporate Error Reporting v1 protocol" for backwards compatibility that is hereby incorporated by reference in its entirety. Other services may exist in order to import crashes to the server manually. Another service can receive crashes in a proprietary way, and crashes will be collected on the client systems 118, 120 and 122 through an agent running on the client systems 118, 120 and 122 as opposed to the current method of relying on Windows Error Reporting adding greater flexibility.

The crash processor module 104 listens for work orders from the messaging server module 112 and runs the received work orders through analysis software, and updates the database 108 with its results.

When the crash analysis server 101 receives a crash dump that is considered to be malicious, an email alert can be sent. Anytime a crash is received that the crash analysis server 101 determines is malicious, an alert email will be sent to specified recipients. This email alert will comprise some details regarding the crash, and a link to a web page providing additional information, much like the data that gets displayed at the bottom of the event table on the crash analysis server 101 homepage.

Once the crash analysis server 101 has identified a malicious crash event, the user will want to respond to the report that is generated. The first step is to confirm the event was malicious. Assume, in arguendo, that the crash was due to Adobe® Reader® and that a copy of the PDF file that caused the crash was obtained. After confirming that the file is malicious using any known virus scanner to identify it as such, steps should be taken to review the client systems 118, 120 and 122 for potential protection problems. Next, the client systems 118, 120 and 122 should be scanned to determine if the file has successfully exploited any of your client systems 118, 120 and 122. Then, identification of any indicators of compromise (IOCs) associated with this document should be searched for on the network. Additionally, the source of the infected file should also be black-listed including any domain names associated with the malware related to the attack. Even though a crash alert was generated, the user should assume the client systems 118, 120 and 122 responsible for the crash are infected.

The database 108 can comprise records storing a user, a machine name or identifier, as well as the IP address and MAC address of the client systems 118, 120 and 122. The user interface 106 can be constructed from any currently known methods, but is preferably built using a web server module that an administrator can connect to view the results from the analysis and data that is stored in the database 108. Crash dump collection 102 can be filtered by a variety of variables using the user interface 106. For example, the administrator can filter client systems 118, 120 and 122 at remote sites, by IP address, to send only minimal information to avoid exhausting constrained bandwidth. The user interface 106 further comprises has functionality to manually retrieve and search the database 108 of crash dumps that have been collected. Also, the user interface comprises user selectable criteria for searching the database 108 to detect ongoing patterns of attacks and other security searches.

Referring now to FIG. 2, there is shown a screenshot of a user interface home page 200 useful for the system of FIG. 1. The user interface 200 comprises a login screen for security and access. As will be understood by those with skill in the art with reference to this disclosure, different permission and access levels can be provided by the user interface 200 to restrict or grant access to the information contained in the system 100. The crash analysis server 101 homepage 200 displays the crashes it has received 202 to date for quick review by the user.

Referring now to FIG. 3, there is shown a screenshot of a settings page 300 of the user interface. The settings page 300 comprises configuration elements for the system 100 that can be set by the user, such as, for example, a "Hostname" for the crash analysis server 101 instance. This is the server name that client systems 118, 120 and 122 will be configured to use to connect to the server. The hostname can be either an IP address or a domain name (ex. "mycranserver.mycompany.com"). However, the hostname cannot be "127.0.0.1" or "localhost", even in testing.

Figure 4:
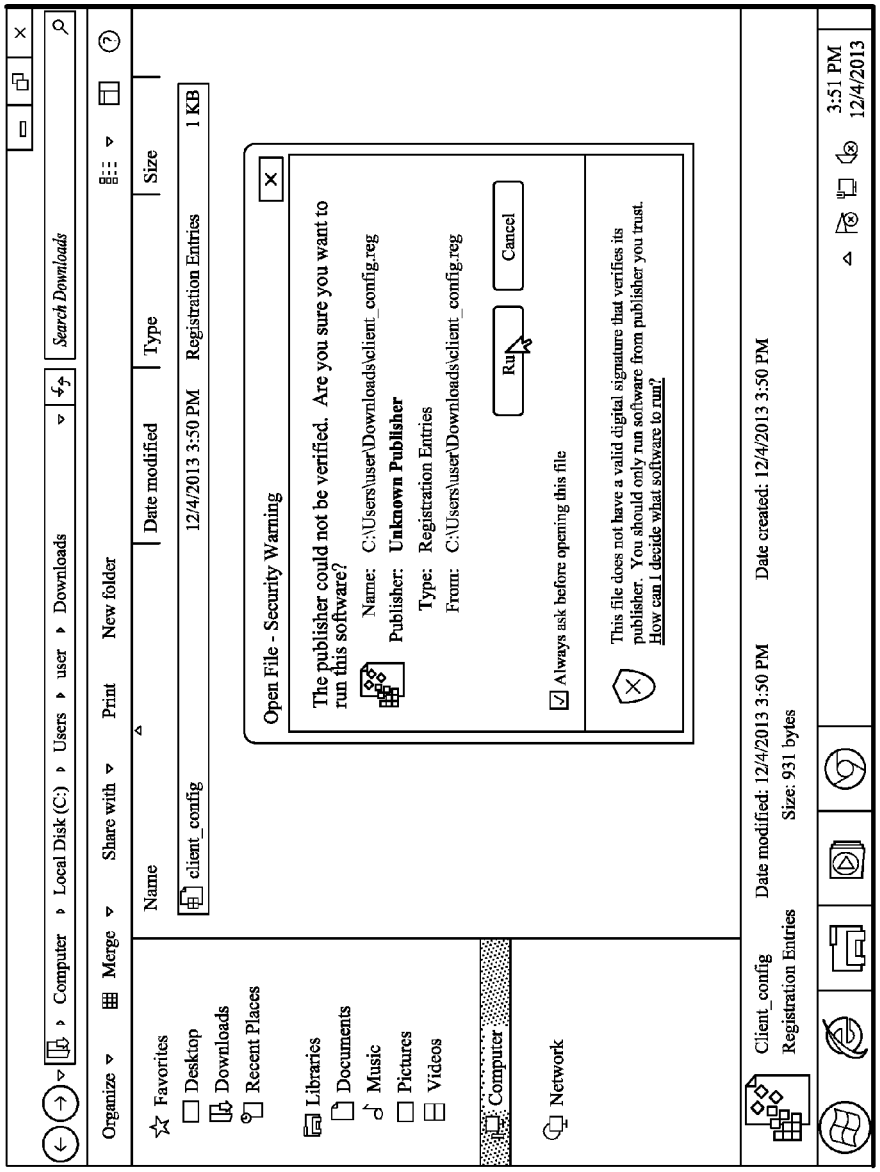
FIG. 4 is a screenshot of a configuring a client to use the system of FIG. 1.
Figure 5:
FIG. 5 is a screenshot of a first crash received notification.

Referring now to FIG. 4, there is shown a screenshot of a client configuration 400 to use the system of FIG. 1. Each client systems 118, 120 and 122 is configured to report crashes to the crash analysis server 101. In a default configuration, crashes will be sent to the crash analysis server 101 unencrypted over HTTP. This can be changed to use HTTPS via advanced configuration settings.

The crash analysis server 101 is configured to work for client systems using Windows Vista, Windows 7, Windows 8, and Windows 2012 in a default installation. Other operating systems can use the crash analysis server 101 provided that the error reporting service from Microsoft® is implemented on the operating system or in a program running on a different operating system. Configuring the client systems 118, 120 and 122 to contact the crash analysis server 101 when crashes occur is set using a plurality of registry keys.

These registry settings can be deployed to clients on a domain using Group Policy.

Figure 6:
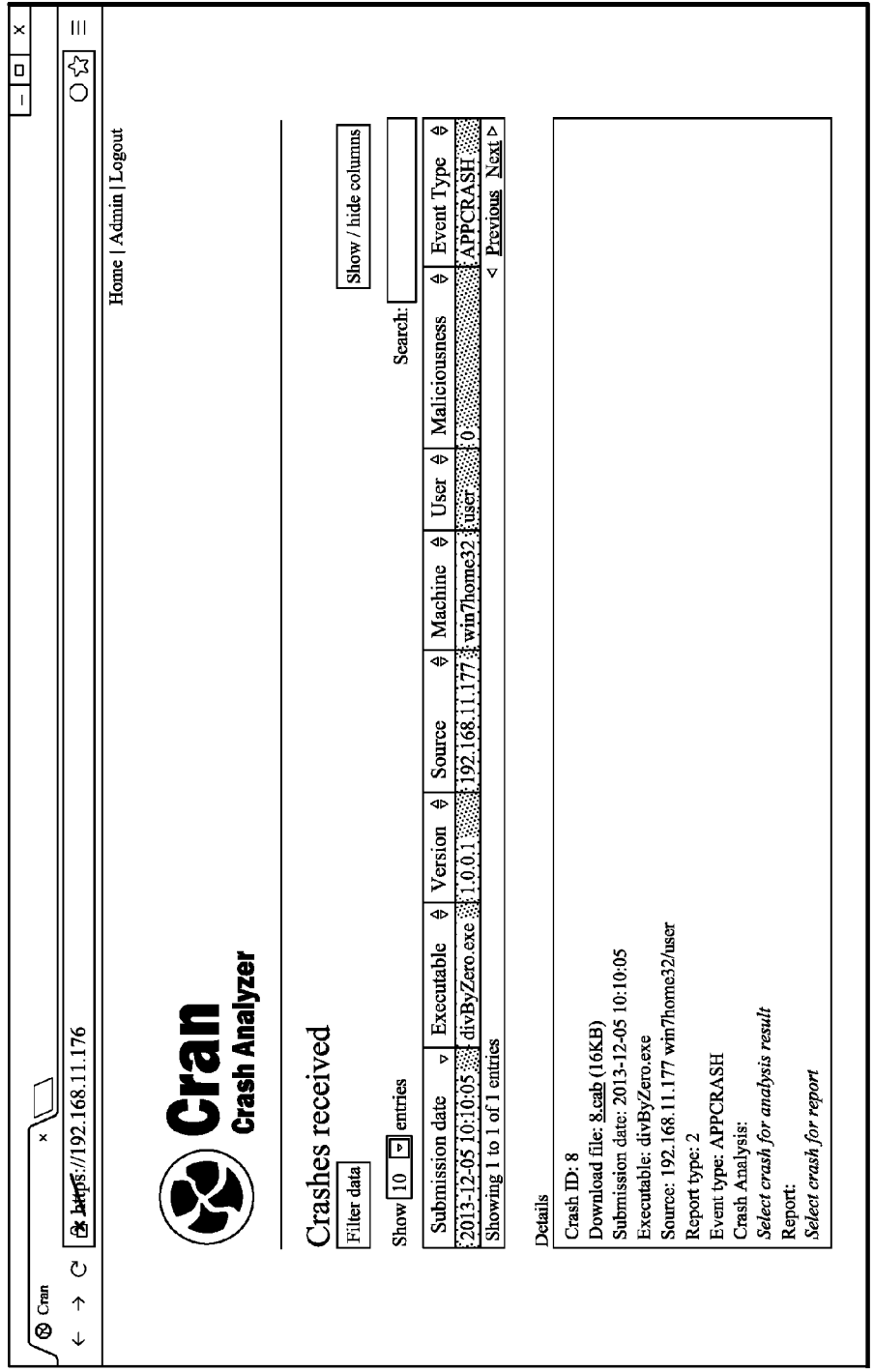
FIG. 6 is a screenshot of a crash high-lighted on the user interface.

Referring now to FIG. 6, there is shown a screenshot of a crash highlighted 600 on the user interface. To see what information the crash analysis server 101 has collected about the client systems 118, 120 and 122 crashes, the user can select crashes listed in the table on the crash analysis server 101 homepage. The crash will be highlighted 600 and a details pane, below the table, will display information regarding the crash. Clicking on this row will lock the bottom pane to showing information about only this crash. Additionally, it will show more information about the crash.

Figure 7:
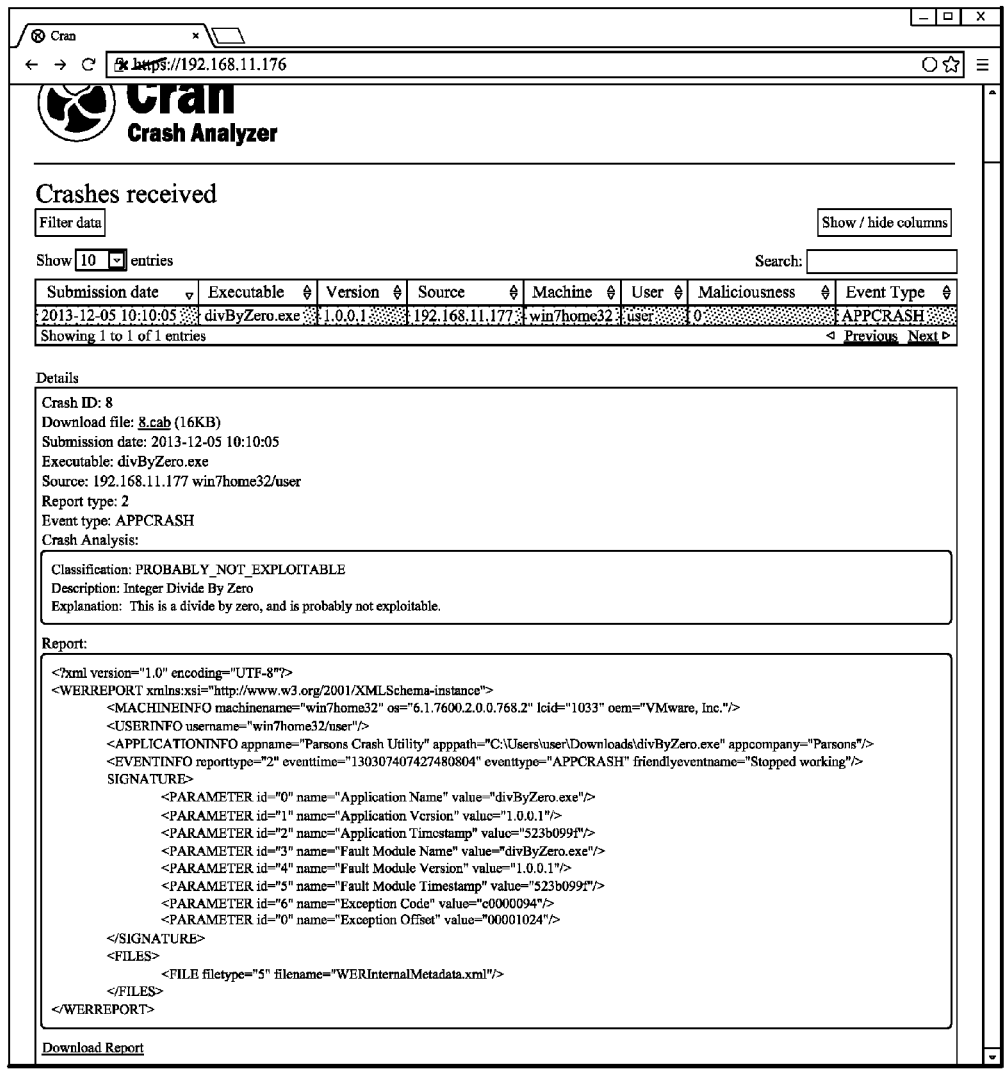
FIG. 7 is a screenshot of a crash locked that also displays a full analysis of the crash.
Figure 11:
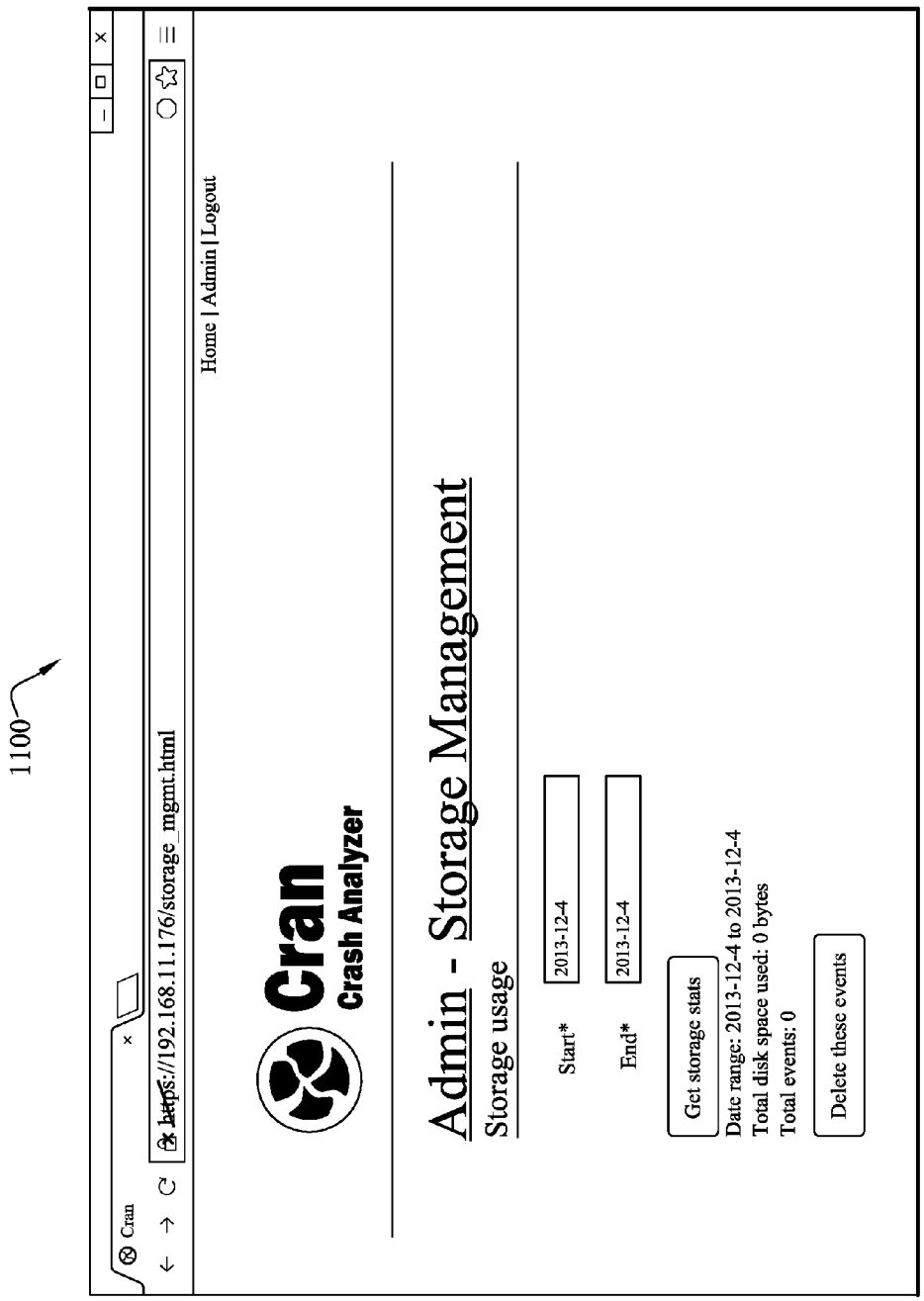
FIG. 11 is a screenshot of a storage management page of the user interface.
Figure 12:
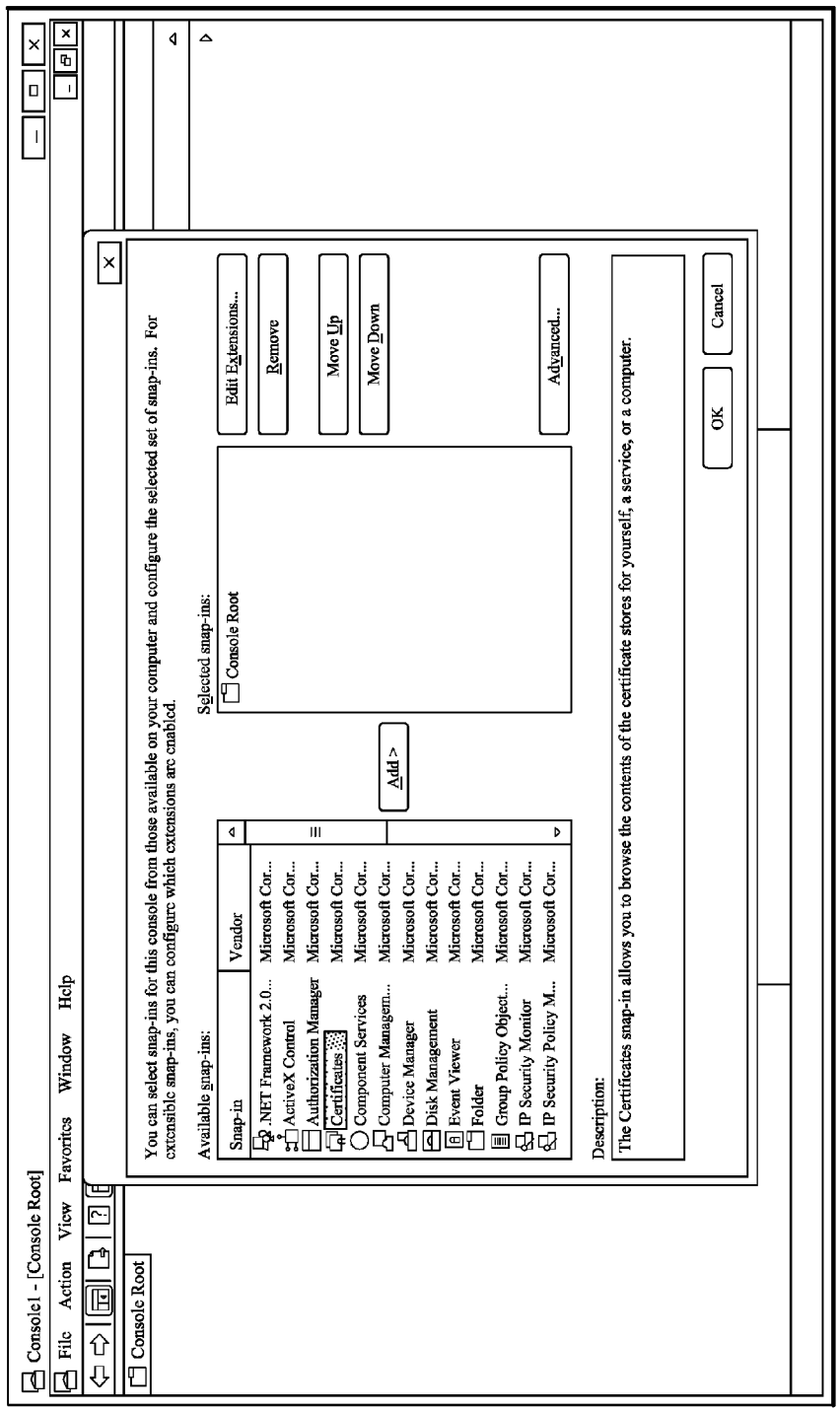
FIG. 12 is a screenshot of a adding a certificates snap-in to the Microsoft Management Console.

Referring now to FIG. 7, there is shown a screenshot of a crash locked 700 that also displays a full analysis of the crash. An extensible mark up language (XML) report at the bottom of the analysis is the first message sent by the client to the server. This report displays the client systems 118, 120 and 122 machine name and the username of the user that executed the process. It also displays some information about the process that caused the crash state, such as the file name and version that was extracted from the file.

The crash report 700 also provides an event type that can identify the reason or reasons that the crash occurred. Many application crashes are caused by a generic event type of APPCRASH, but as an example a crash related to a DEP exception will be reported as a BEX crash, or BEX64 if it occurred within a 64-bit process. The crash analysis server 101 will also receive other reports that were meant for the Microsoft Windows Error Reporting server that are not crashes, but that can be useful in exploit detection and security.

The crash analysis server 101 uses the crash report information 700 to automatically determine if it should collect a crash dump from the client systems 118, 120 and 122. If a crash dump was collected then further analysis is performed on the crash dump that may increase the suspected "maliciousness" score. This score defaults to 0, meaning it is not believed to be malicious. Higher scores, up to 100, indicate the analysis believes it could indicate something malicious was attempted, and should be reviewed further.

The crash dump 700 can be downloaded as a .cab file that can be extracted as a .zip file. The crash dump 700 can comprise:

WERInternalMetadata.xml: This duplicates much of the information that was sent in the original XML report, with some additional information about the client system.

wql.txt: The crash analysis server 101 requests the client to create this file and it contains information about the client system such as MAC addresses of the network cards which may be useful to track down the system that caused this crash.

minidump.mdmp: This is a crash minidump which may be loaded into WinDbg, the Windows Debugger, for more advanced analysis.

Some .cab files may also contain the document that caused the crash. For example, Adobe® Reader® crashes should include the relevant .pdf file.

In some circumstances, the crash analysis server 101 can provide a copy of the document that caused the crash. For example, Adobe Reader crashes normally provide a copy of the relevant PDF file. Additionally, analysis can be performed on this file using PDF analysis or virus scanning tools. This information can then be used in an incident response report.

Figure 14:
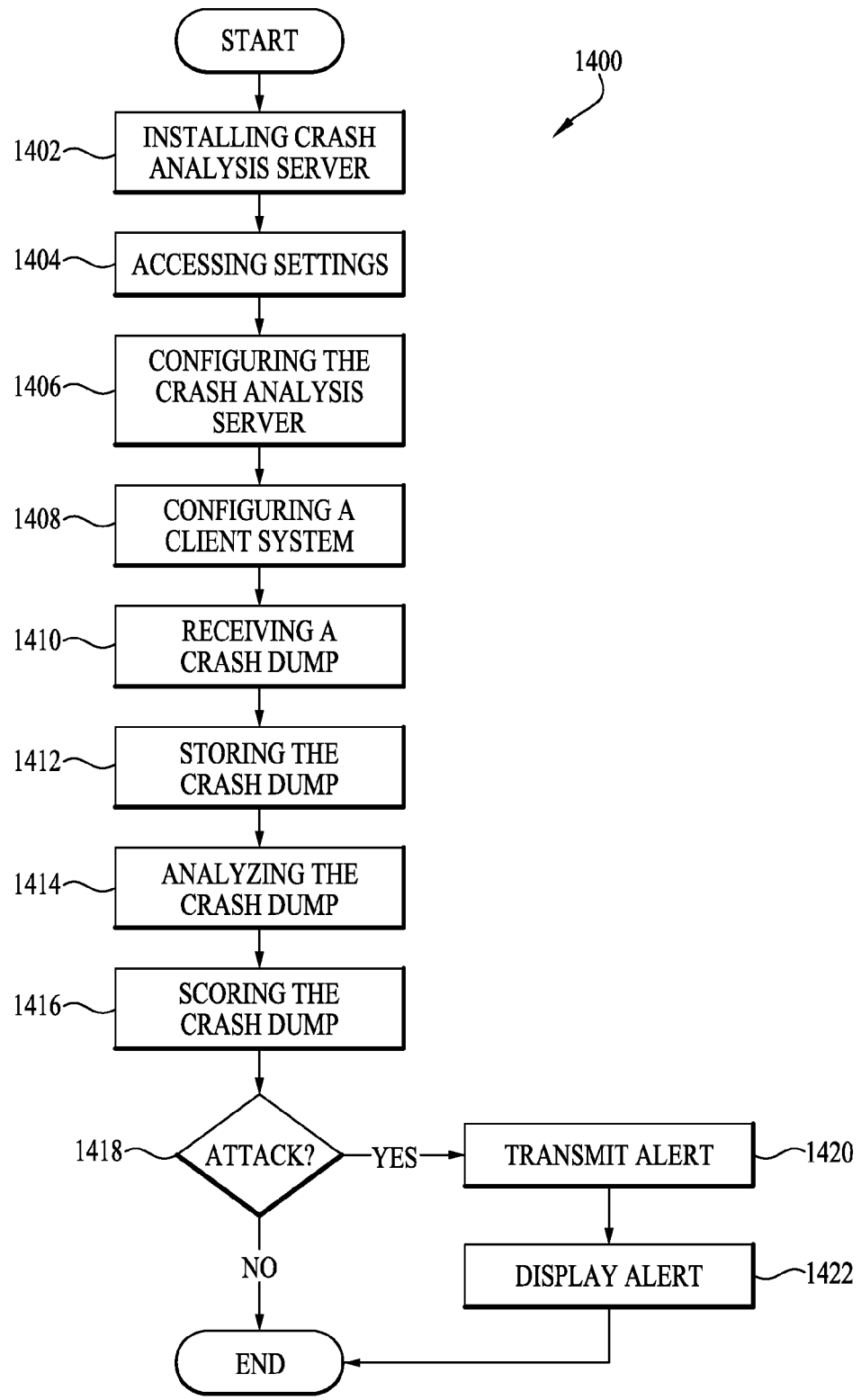
FIG. 14 is a flowchart diagram of some steps of a method for using the system of FIG. 1.

FIG. 14 is a flowchart diagram of some steps of a method 1400 for using the system of FIG. 1. First, the crash analysis server 101 of FIG. 1 is installed 1402. Then, a user accesses 1404 the crash analysis server 101 settings to configure 1406 the crash analysis server 101. Next, client systems 118, 120 and 122 are configured 1408 to report to the crash analysis server 101. Then, when a crash dump is received 1410 from the client systems 118, 120 and 122, the crash dump is stored 1412 in a storage. Next, the crash dump is analyzed 1414 for malicious attacks. Then, the crash dump analysis is scored 1416. Then, a determination 1418 is made whether or not the crash dump score qualifies as an attack. Next, an alert is transmitted 1420 if the crash dump score qualifies as an attack. Finally, an alert is displayed 1422 on a user interface if the crash dump score qualifies as an attack.

What has been described is a new and improved system for automatically collecting and analyzing crash dumps to determine if a security exploit was unsuccessful and generating a report overcoming limitations in the prior art.

Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. §112.

What is claimed is:

1. A network comprising:
   a server configured to receive automatically generated reports from clients identifying crash events;
   a crash analyzer in the server configured to respond to each crash report from a client by:
   determining from the crash report whether to collect a crash dump from the client reporting the crash event;
   collecting a crash dump from the client reporting the crash event if it is determined to collect the crash dump from the client reporting the crash event;
   analyzing the crash dump to assign a maliciousness score to the crash event.

2. The network of claim 1 where the crash analyzer is further configured to respond if the maliciousness score from the analysis of the crash dump exceeds a threshold by:
   confirming that the crash event was malicious; and
   generating and transmitting an alert message.

3. The network of claim 2 wherein the crash analyzer is further configured to scan other clients on the network for problems attributable to the malicious crash event.

4. The network of claim 2 wherein the crash analyzer is further configured to:
   identify from the crash dump a file that caused the crash event;
   examine the file to determine if a source of the file can be determined; and
   black list the source of the file, including any domain names associated with the source.

5. A method for operating a network comprising:
   receiving from clients on the network automatically generated reports identifying crash events;
   responding to each crash report from a client by:
   determining from the crash report whether to collect a crash dump from the client reporting the crash event;

collecting a crash dump from the client reporting the crash event if it is determined to collect the crash dump from the client reporting the crash event;

analyzing the crash dump to assign a maliciousness score to the crash event.

6. The method of claim 5 wherein if the maliciousness score from the analysis of the crash dump exceeds a threshold:

confirming that the crash event was malicious; and generating and transmitting an alert message.

7. The method of claim 6 further comprising scanning other clients on the network for problems attributable to the malicious crash event.

8. The method of claim 6 further comprising:

identifying from the crash dump a file that caused the crash event;

examining the file to determine if a source of the file can be determined; and black listing the source of the file, including any domain names associated with the source.

* * * * *